United States Patent
Niessen

(10) Patent No.: US 9,953,174 B2
(45) Date of Patent: Apr. 24, 2018

(54) METHOD AND SYSTEM FOR IN-BAND PASSWORD MANAGEMENT FOR INDUCTIVE WIRELESS CHARGING

(71) Applicant: NXP B.V., Eindhoven (NL)

(72) Inventor: Patrick Niessen, Eindhoven (NL)

(73) Assignee: NXP B.V., Eindhoven (NL)

( * ) Notice: Subject to any disclaimer, the term of this patent is extended or adjusted under 35 U.S.C. 154(b) by 155 days.

(21) Appl. No.: 14/841,602

(22) Filed: Aug. 31, 2015

(65) Prior Publication Data

US 2017/0061142 A1 Mar. 2, 2017

(51) Int. Cl.
| | |
|---|---|
| *G06F 7/04* | (2006.01) |
| *G06F 12/00* | (2006.01) |
| *G06F 12/14* | (2006.01) |
| *G06F 13/00* | (2006.01) |
| *G06F 17/30* | (2006.01) |
| *G11C 7/00* | (2006.01) |
| *G06F 21/60* | (2013.01) |
| *H02J 7/02* | (2016.01) |
| *H02J 50/10* | (2016.01) |
| *H02J 50/80* | (2016.01) |
| *G06F 21/81* | (2013.01) |

(52) U.S. Cl.
CPC ............ *G06F 21/604* (2013.01); *G06F 21/81* (2013.01); *H02J 7/025* (2013.01); *H02J 50/10* (2016.02); *H02J 50/80* (2016.02)

(58) Field of Classification Search
CPC .. H02J 7/025; H02J 50/00; H02J 50/10; H02J 50/12; H02J 50/80; H04B 5/0037; G06F 21/604; G06F 21/44; G06F 21/445; G06F 21/30; G06F 21/31; G06F 21/81; H04L 63/083; H04L 63/0838; H04L 63/0846; H04W 12/06; H04W 12/08

See application file for complete search history.

(56) References Cited

U.S. PATENT DOCUMENTS

| | | | | |
|---|---|---|---|---|
| 2010/0201310 A1* | 8/2010 | Vorenkamp | ............ | G06Q 30/04 320/108 |
| 2011/0136550 A1 | 6/2011 | Maugars | | |
| 2012/0164943 A1* | 6/2012 | Bennett | .............. | G06Q 20/3674 455/41.1 |
| 2013/0005245 A1* | 1/2013 | Royston | ............... | H04B 5/0037 455/41.1 |
| 2013/0293190 A1* | 11/2013 | Pijnenburg | .............. | H02J 7/022 320/108 |
| 2013/0326601 A1* | 12/2013 | Nishikawa | ....... | H04N 21/25816 726/6 |
| 2014/0195803 A1* | 7/2014 | Knubben | .................. | H04L 9/32 713/168 |
| 2015/0006395 A1* | 1/2015 | Chu | ....................... | G06Q 20/40 705/44 |

(Continued)

OTHER PUBLICATIONS

Power Matters Alliance, Inc. "PMA Inductive Wqirless Power and Charging Transmitter Specification—System Release 1"; PMA-TS-003-0, v 2.00; 65 pgs.; Apr. 24, 2014.

(Continued)

*Primary Examiner* — Trong Nguyen

(57) ABSTRACT

A method for authorizing a service is disclosed. In the embodiment, the method involves receiving a packet carried via a first power signal according to an inductive wireless power transfer communications protocol, the packet received at a power receiver within a mobile device, extracting a password from the received packet, storing the extracted password in memory within the mobile device, transmitting the stored password in a packet via a second power signal according to the inductive wireless transfer communications protocol to authorize a service.

18 Claims, 11 Drawing Sheets

(56) References Cited

U.S. PATENT DOCUMENTS

| | | | | |
|---|---|---|---|---|
| 2015/0091496 A1* | 4/2015 | Meunier | ............... | H02J 7/025 |
| | | | | 320/106 |
| 2015/0155918 A1* | 6/2015 | Van Wageningen | . | H04B 5/0031 |
| | | | | 307/104 |
| 2015/0244201 A1* | 8/2015 | Chu | ............ | H02J 7/025 |
| | | | | 320/108 |
| 2015/0340879 A1* | 11/2015 | Chu | ............ | H02J 5/00 |
| | | | | 455/573 |
| 2016/0050563 A1* | 2/2016 | Bronk | ............ | H02J 50/10 |
| | | | | 726/7 |
| 2017/0018965 A1* | 1/2017 | Lee | ............ | H02J 50/80 |

OTHER PUBLICATIONS

Wireless Power Consortium, "System Description, Qi Medium Power Transfer", version 0.9-1; 239 pgs.; Oct. 31, 2014.
Johns, Bill. "An Introduction to the Wireless Power Consortium Standard and TI's Compliant Solutions." Analog Applications Journal (2011): 10-12. Spring 2011. Web.
"System Description Wireless Power Transfer", vol. 1: Low Power, Part 1: Interface Definition, version 1.1.2: 186 pgs; Jun. 2013.
"System Description Wireless Power Transfer", vol. 1: Low Power, Part 2: Performance Requirements, version 1.1.2; 42 pgs; Jun. 2013.
"System Description Wireless Power Transfer", vol. 1: Low Power, Part 3: Compliance Testing, version 1.1.2; 138 pgs; Jun. 2013.
"System Description Wireless Power Transfer", vol. 1: Low Power, Part 1: Interface Definition, version 1.2; 3 pgs; Jun. 2015.

* cited by examiner

| PROFILE | PASSWORD | DESCRIPTION |
|---|---|---|
| GUEST | *NULL* | 5 MIN OF POWER |
| DRINK ONLY | D2ID9qK142 | 1 HOUR OF POWER |
| ENTREE | 3Gmoasy3JG | 2 HOURS OF POWER |
| BRONZE | n889qa7zpM | 7 HOURS OF POWER |
| SILVER | PtZyLn1v19 | 12 HOURS OF POWER |
| GOLD | 87DP2j3hdp | 1 MONTH UNLIMITED POWER |

FIG. 10

M ETHOD AND SYSTEM FOR IN-BAND
PASSWORD MANAGEMENT FOR
INDUCTIVE WIRELESS CHARGING

BACKGROUND

Inductive coupling to wirelessly transfer power to a mobile device, using Qi or other standards, is becoming popular in the consumer market. Inductive wireless power transfer offers consumers many benefits including, most notably, the convenience of charging without the need for wires or bulky docking systems. Many retail outlets are beginning to offer wireless charging to customers while the customers utilize other services offered by the retail outlets. For example, many coffee shops are beginning to offer wireless charging systems for customer use. Authentication systems or other systems of control can be used to control access to a wireless charging system and, thus, a fee can be assessed to customers in exchange for access to the wireless charging system.

SUMMARY

In an embodiment, a method for authorizing a service is disclosed. In the embodiment, the method involves receiving a packet carried via a first power signal according to an inductive wireless power transfer communications protocol, the packet received at a power receiver within a mobile device, extracting a password from the received packet, storing the extracted password in memory within the mobile device, transmitting the stored password in a packet via a second power signal according to the inductive wireless transfer communications protocol to authorize a service.

In a second embodiment, a method for inductive wireless charging of a mobile device is disclosed. In the embodiment, the method involves receiving a packet carried via a first power signal according to an inductive wireless power transfer communications protocol, the packet received at a power receiver within a mobile device, extracting a password from the received packet, storing the extracted password in memory within the mobile device, and transmitting the stored password in a packet via a second power signal according to the inductive wireless power transfer communications protocol, and receiving a power transfer at the power receiver of the mobile device in response to transmitting the stored password.

In a third embodiment, a mobile device including a power receiver is disclosed. In the embodiment, the power receiver of the mobile device is configured to receive a packet carried via a first power signal according to an inductive wireless power transfer communications protocol, extract a password from the received packet, to store the extracted password in memory within the mobile device, and to transmit the stored password in a packet via a second power signal according to the inductive wireless power transfer communications protocol to authorize a service.

Other aspects and advantages of embodiments of the present invention will become apparent from the following detailed description taken in conjunction with the accompanying drawings.

BRIEF DESCRIPTION OF THE DRAWINGS

FIG. 10 depicts a table of charging profiles and corresponding passwords.

Throughout the description, similar reference numbers may be used to identify similar elements.

DETAILED DESCRIPTION

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

Figure 1:
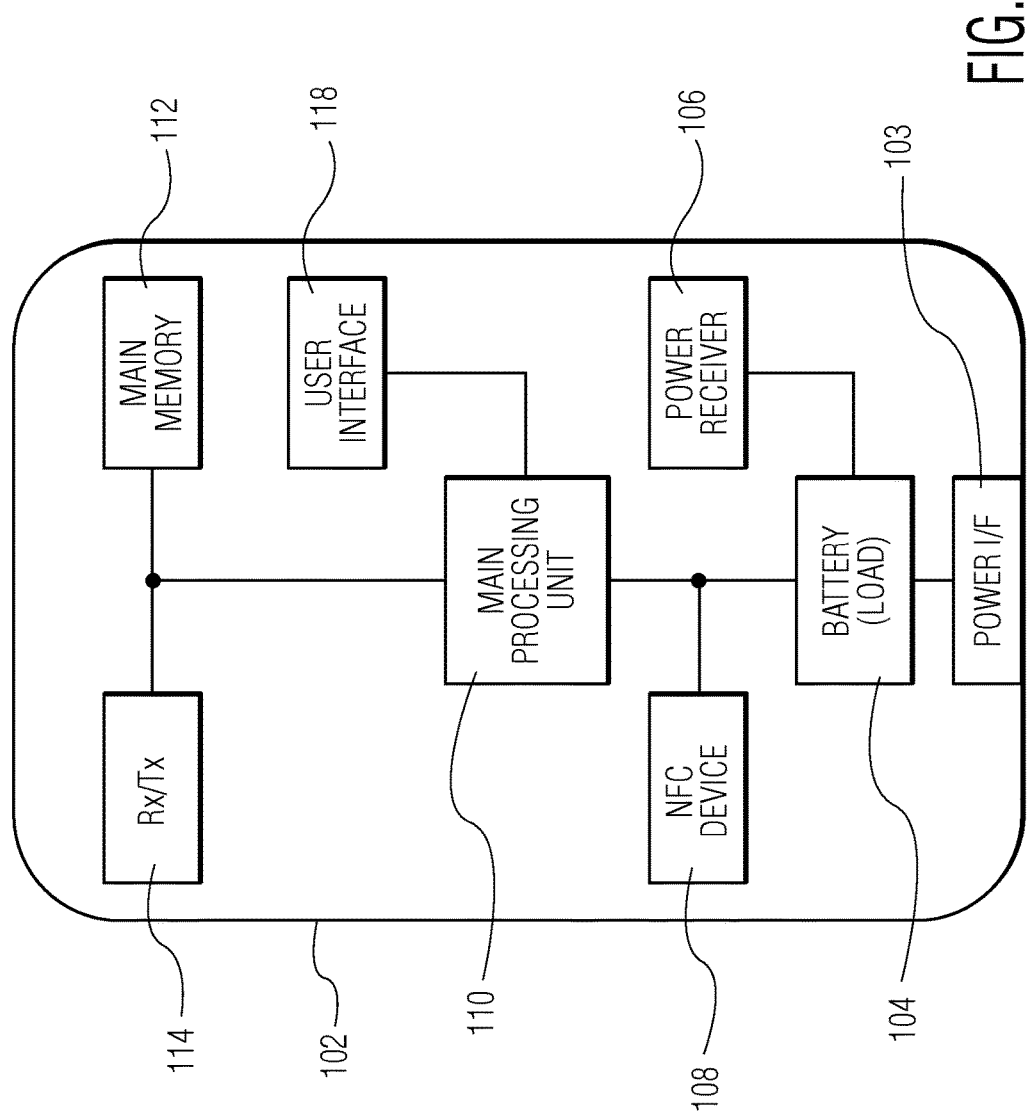
FIG. 1 is a block diagram of a mobile device configured to support inductive wireless power transfer (IWPT).

A mobile device, such as a mobile phone, can be configured to support inductive wireless power transfer. FIG. 1 is a block diagram of a mobile device 102, such as a mobile phone, configured to support inductive wireless power transfer (IWPT). In the embodiment of FIG. 1, the mobile device includes a power interface 103, a battery 104, a power receiver 106, a near-field communication device (NFC device) 108, a main processing unit 110, a main memory 112, a transceiver (Rx/Tx) 114, and a user interface 118. In an embodiment, the power interface and the power receiver are coupled to the battery. The battery provides power to the NFC device, the main processing unit, the main memory, the transceiver (e.g., a cellular radio or Wi-Fi radio), and the user interface as is known in the field.

In an IWPT system, the power receiver 106 is independent of the other components (e.g., the main memory 112 or the main processing unit 110) and can power-on with power received from a power transmitter external to the mobile device 102 without powering-on the other components of the mobile device and without drawing power from the battery 104. Furthermore, the power receiver is independent of the other components and can power-on and charge the battery of the mobile device even when the battery of the mobile device is completely discharged or when the mobile device cannot otherwise be powered-on.

In an embodiment, the mobile device 102 can communicate over several bands that use, for example, GSM/CDMA, Wi-Fi, NFC, a user interface, or an IWPT communications standard such the Qi standard developed by the Wireless Power Consortium (WPC). In an embodiment, communications that use the Qi protocol (or other IWPT protocols such as the Power Matters Alliance's PMA standard) are referred to as "in-band" communications or "in-band" channels, while communications that use GSM/CDMA, Wi-Fi, or NFC are referred to as "out-of-band" communications or "out-of-band" channels.

Figure 2:
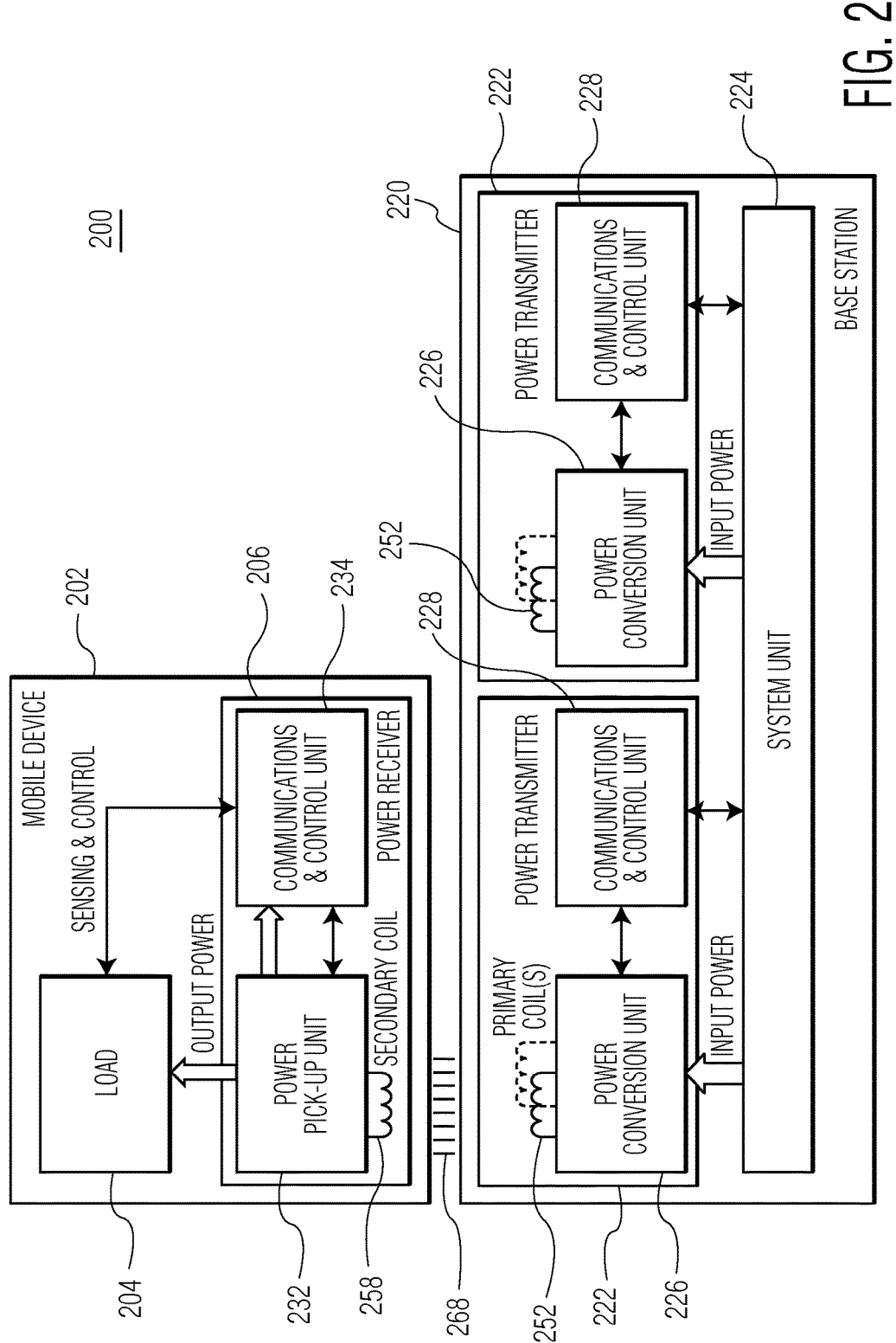
FIG. 2 depicts an IWPT system that includes a base station and a mobile device in close proximity to the base station.

FIG. 2 depicts an IWPT system 200 that includes a base station 220 and a mobile device 202 in close proximity to the base station. The base station includes two power transmitters 222 coupled to a system unit 224 and the mobile device 202 includes a power receiver 206 and a load 204 (e.g., a rechargeable battery). In an embodiment, the power transmitters of the base station include a power conversion unit 226 and a communications and control unit 228 and the power receiver of the mobile device includes a power pick-up unit 232 and a communications and control unit 234. In an embodiment, the system unit of the base station includes rules and logic for controlling the behavior of the power transmitters. The base station can include only one power transmitter or more than one power transmitter and, although only one mobile device is shown, each power transmitter can be paired with a different mobile device such that the base station can charge a number of mobile devices equal to the number of power transmitters in the base station. In an embodiment, the power conversion unit of the power transmitter and the power pick-up unit of the power receiver include coils 252, 258, respectively, which can transmit or receiver a power signal 268 and the respective communications and control units of the power transmitter and the power receiver are configured to use the power signal to communicate with each other in-band. In an embodiment, the communication is facilitated by modulating the flow of power between two parts (e.g., between the power transmitter and the power receiver). In an embodiment, the modulation can be performed by amplitude shift keying (ASK) and/or frequency shift keying (FSK) of the power signal transmitted between the power pick-up unit and the power transmitter. For example, the mobile device can send a communication to the base station using load modulation in an ASK packet and the base station can send a communication to the mobile device using a frequency modulated packet (FSK). The base station depicted in FIG. 1 is shown with two power transmitters, but only the left power transmitter is paired with a mobile device.

Figure 3:
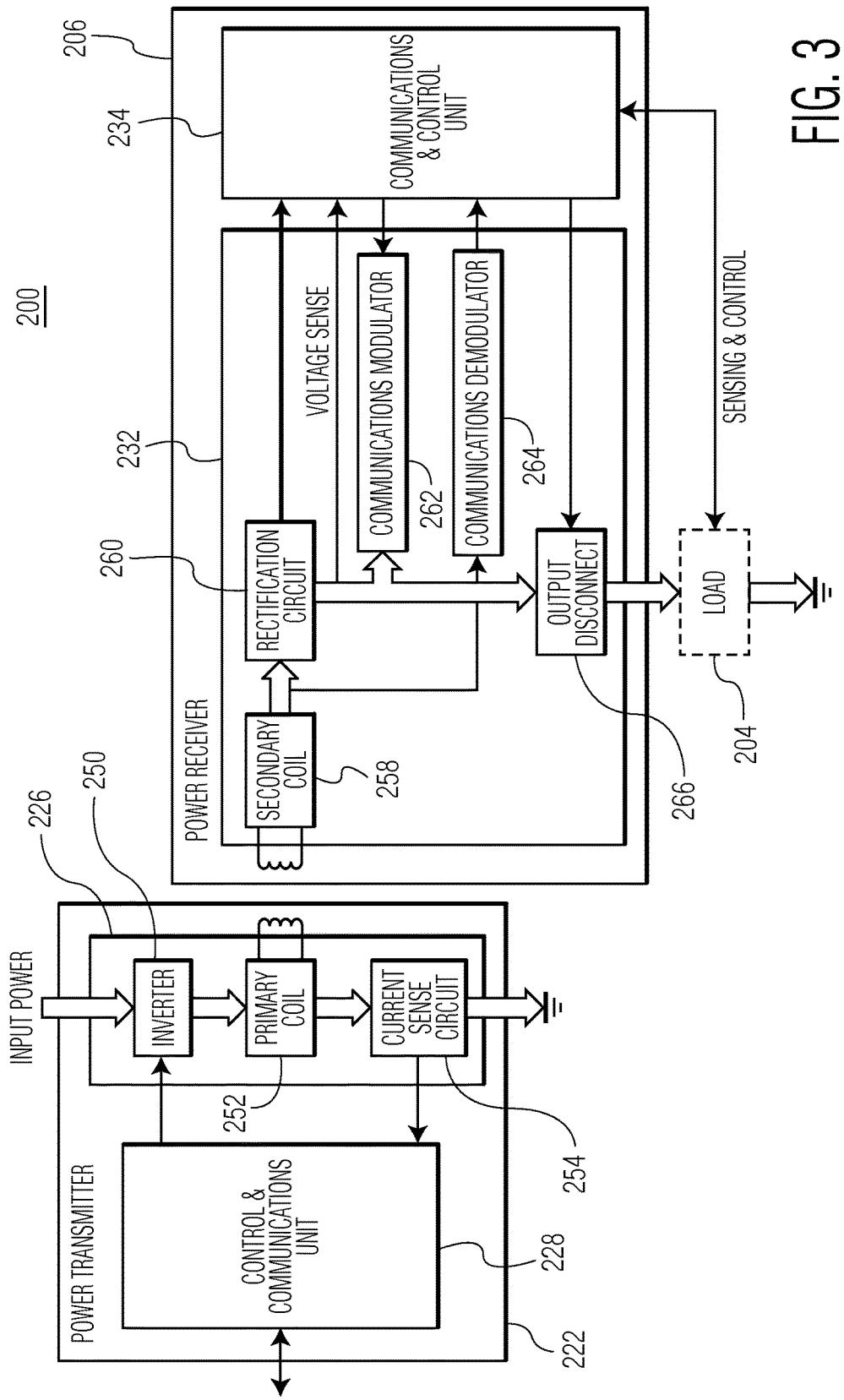
FIG. 3 is a block diagram of the power transmitter and the power receiver of the IWPT system of FIG. 2.

FIG. 3 is a block diagram of the power receiver 206 and one of the power transmitters 222 of the IWPT system 200 of FIG. 2. In an embodiment, the power transmitter includes a power conversion unit 226 and a control and communications unit 228. The power conversion unit includes an inverter 250, a primary coil 252, and a current sense circuit 254. Power is received by the inverter and current is run though the primary coil to create an electromagnetic field. The current sense circuit allows for information to be gathered from the primary coil such as whether a power receiver is within range (e.g., whether a mobile device is on or near the primary coil) and/or the amount of power being drawn from the power transmitter by a power receiver. The current sense circuit transmits the gathered information to the control and communications unit, and the control and communications unit interprets the gathered information.

In an embodiment, the power receiver 206 includes a power pick-up unit 232 and a communications and control unit 234. The power pick-up unit includes a secondary coil 258, a rectification circuit 260, a communication modulator 262, a communications demodulator 264, and an output disconnect 266, which is located between the rectification circuit and a load 204. In an embodiment, current is generated in the secondary coil by the electromagnetic field of the primary coil and the rectification circuit rectifies an AC waveform from the secondary coil to provide power to the communications and control unit. The rectification circuit also provides power to an output (e.g., a connection to a load) without drawing power from the load. In an embodiment, the output disconnect is a switch that can prevent current from flowing to the output (and thus the load). The communications modulator and communications demodulator are used by the communications and control unit to modulate the amount of power drawn from the primary coil in order to produce high and low states in the power signal and, thus, communicate with the power transmitter in-band over an IWPT signal. That is, by modulating the state of the power signal, the power transmitter (using FSK) and power receiver (using ASK) can communicate digital data without using an out-of-band channel such as GSM/CDMA, NFC, or Wi-fi.

Figure 4:
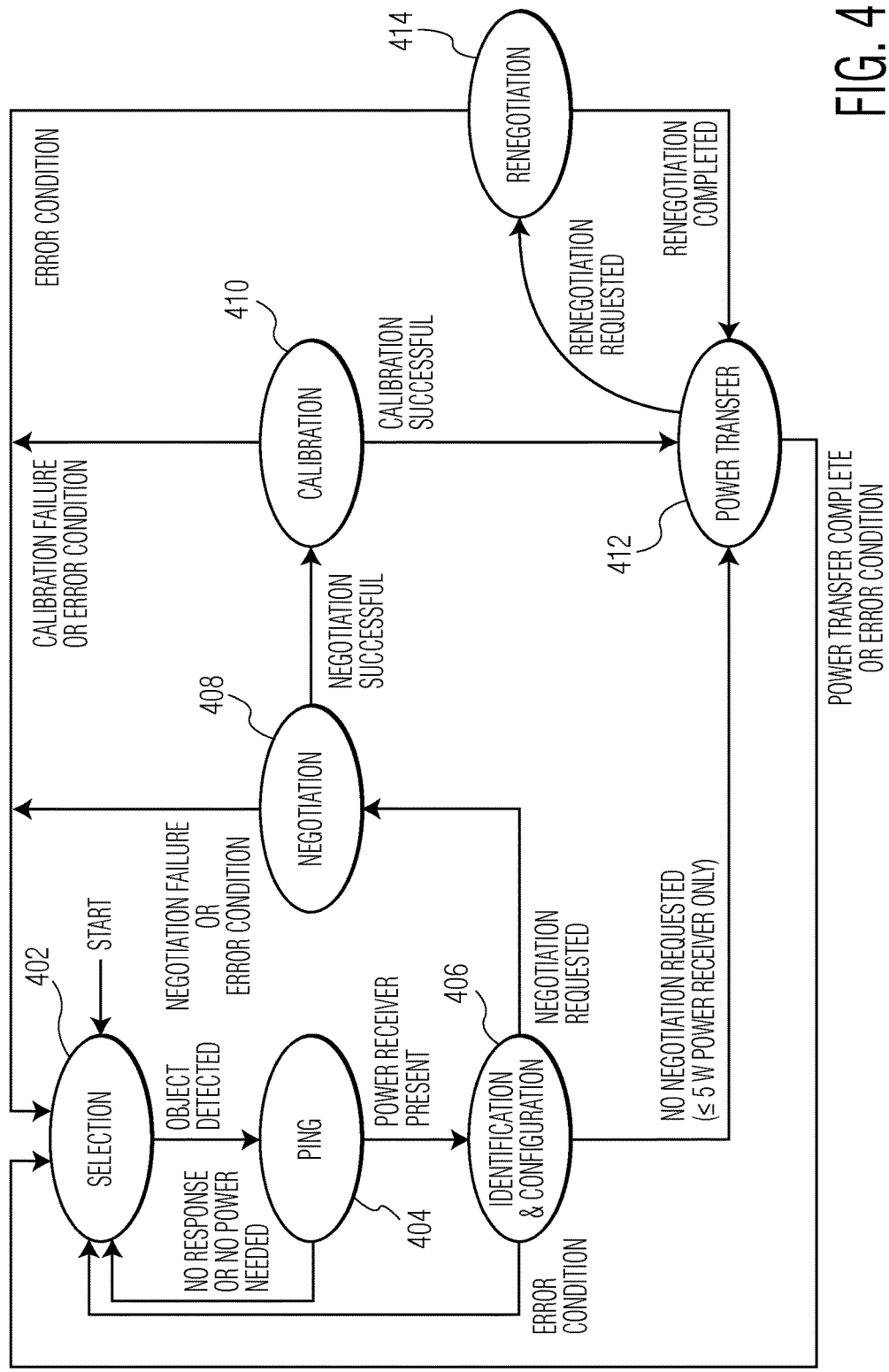
FIG. 4 illustrates the relation between power transfer phases.

According to the Qi protocol, initiation of inductive wireless power transfer involves several power transfer phases. FIG. 4 illustrates the relation between power transfer phases. In an embodiment, IWPT involves seven phases: a selection phase 402, a ping phase 404, an identification and configuration phase 406, a negotiation phase 408, a calibration phase 410, a power transfer phase 412, and a renegotiation phase 414. In the selection phase, the base station typically monitors the placement and removal of objects from the surface of the base station using a small measurement signal. The signal is typically a low voltage signal that does not wake a power receiver. Once the base station determines that an object has been placed on the surface of the base station, a power transmitter of the base station enters the ping phase. In the ping phase, the power transmitter executes a digital ping and listens for a response. If a power receiver is not present or the power transmitter otherwise does not receive a response (e.g., the presence of a foreign object or incorrect placement on the base station), then the power transmitter will return to the selection phase. If the power transmitter receives a response, then the power transmitter may extend the digital ping and transition to the identification and configuration phase. In the identification and configuration phase, the power transmitter identifies the power receiver that responded to the digital ping in the ping phase. In accordance with the Qi specification, a power receiver can be identified by characteristics of the power transfer (e.g., voltage and amplitude) or by a media access control (MAC) address or other static ID that is unique to a specific power receiver. The power receiver can provide the characteristics or static ID to the power transmitter using a packet sent via the power signal. Once the power transmitter identifies the power receiver, the power transmitter enters the negotiation phase. In the negotiation phase, the power receiver sends negotiation requests to the power transmitter to fine-tune the settings of the power transfer. The power transmitter can grant or deny the negotiation requests as well as continue to determine if a foreign object is present between the surface of the base station and the power receiver. Once the settings of the power transfer have been negotiated, the power transmitter enters the calibration phase. In the calibration phase, the power transmitter uses information received from the power receiver to further improve foreign object detection. Once the power transmitter has finalized calibration and no foreign object is detected, the power transmitter enters the power transfer phase. In the power transfer phase, the power transmitter continues to check if a new foreign object has been placed on the surface of the base station and delivers a power signal to the power receiver. If, at any point during the power transfer phase, renegotiation is requested by the power receiver, then the power transmitter enters the renegotiation phase. In the renegotiation phase, the power receiver can make additional negotiation requests to the power transmitter and then the power transmitter can re-enter the power transfer phase once the requests are resolved. Once charging is complete, the power transmitter returns to the selection phase. As indicated in FIG. 4, if error conditions occur during the negotiation phase, the calibration phase, or the renegotiation phase, the power transmitter returns to the selection phase.

Figure 5:
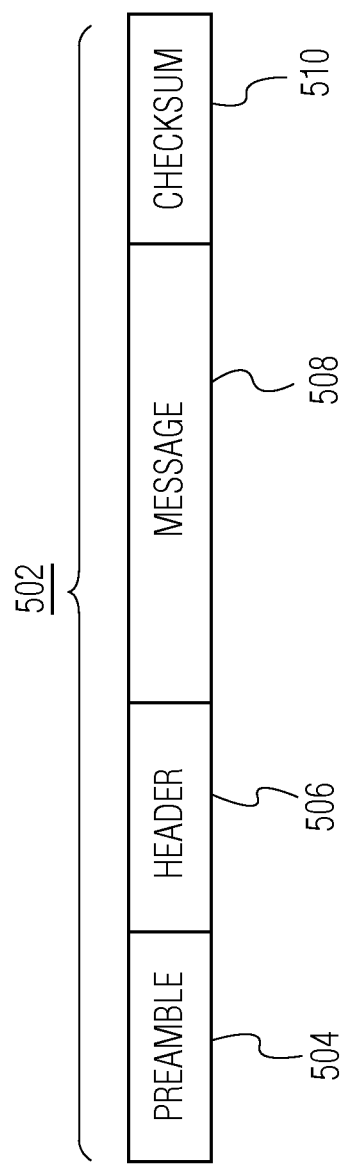
FIG. 5 depicts the format of a packet according to the Qi wireless charging protocol.

FIG. 5 depicts the format of a packet according to the Qi wireless charging protocol. In accordance with the Qi wireless charging protocol, a packet 502 includes four parts: a preamble 504, a header 506, a message 508, and a checksum 510. The preamble has between 11 and 25 bits, all set to one, and the preamble enables the power transmitter to accurately detect the start bit of the header. The header has a single byte that indicates the packet type. By identifying the packet type, the message size contained in the packet is inferred. For example, a packet with header 0x00 can be inferred to have a 1x32 message. The message can carry information as depicted in the table shown in FIG. 6 below and, once received, the message can be checked for transmission errors using the checksum, which is a single byte long.

Figure 6:
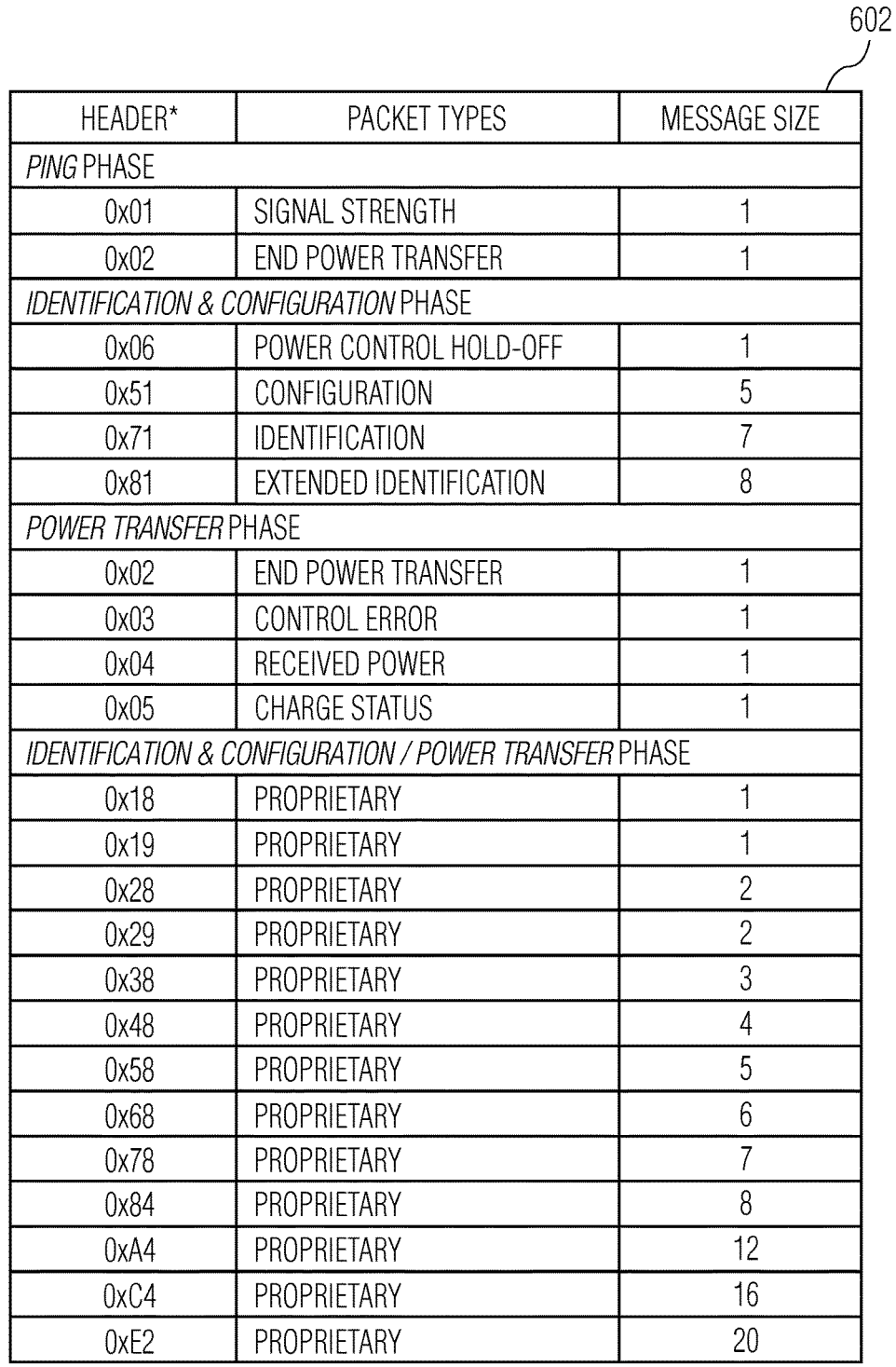
FIG. 6 depicts a table of possible packet types according to the Qi wireless charging protocol.

FIG. 6 depicts a table 602 of possible packet types according to the Qi wireless charging protocol. As depicted in the table, packet types can be categorized by the transfer phase in which they are used. For example, a signal strength packet can be categorized as a ping phase packet, an identification packet can be categorized as an identification and configuration phase packet, and a received power packet can be categorized as a power transfer phase packet. Additionally, several packets are proprietary packets without standardized functionality and allow for developers to use custom packets.

Authentication or other systems of control can be used to control access to wireless charging systems to, for example, limit access to paying customers. However, typically, authentication or other systems of control require at least one other band of communication (e.g., user-input via a touchscreen, Bluetooth, or NFC), which requires the device to have enough charge to power-on the device such that the relevant components are operational. Additionally, the authentication or other system of control may utilize a pin or password that needs to be manually entered by a user, which may negatively impact the ease of using the system. These techniques are frustrated when a device has discharged too much to power-on and/or when the techniques involve manual user input.

In accordance with an embodiment of the invention, a method for authorizing a service is disclosed. In the embodiment, the method involves receiving a packet carried via a first power signal according to an inductive wireless power transfer communications protocol, the packet received at a power receiver within a mobile device, extracting a password from the received packet, storing the extracted password in memory within the mobile device, and transmitting the stored password in a packet via a second power signal according to the inductive wireless transfer communications protocol to authorize a service. By using the inductive wireless power transfer communications protocol to communicate between a power transmitter and a power receiver, a service (e.g., wireless charging) can be initialized by exchanging a password without the need for out-of-band communication (e.g., user input, Bluetooth, NFC, Wi-Fi, etc.) and without powering-on components of the device other than the power receiver. In an application, a power receiver of a mobile device, such as a mobile phone, can extract a password from a packet received via a power signal from a first power transmitter (e.g., at a point-of-sale) and use the same password to authorize, for example, wireless power transfer from a second power transmitter (e.g., at a table, bar, or other place of charging).

In an example implementation, when a customer purchases a cup of coffee, the customer can place his or her mobile phone on a first power transmitter coupled to a point-of-sale system to receive a ping 404 (FIG. 4) from the first power transmitter. The mobile phone responds to the ping of the first power transmitter and the power transmitter advances to the identification and configuration phase 406 in which the mobile phone is configured by receiving a password from the point-of-sale system via the power transmitter. In an embodiment, when the mobile phone is placed on the first power transmitter, the mobile phone sends a packet having a "negotiation bit" and a "password control bit" to the power transmitter. When the negotiation bit is set, the power transmitter determines that the mobile phone is negotiation capable and that communication using FSK (bi-directional communication) is possible. Then, when the power transmitter enters the negotiation phase, the receiver can request information from the transmitter and, since the receiver has indicated that it is password capable, the transmitter can return a password as part of the information. Then, the mobile phone can be placed on a second power transmitter at, for example, a table. The mobile phone responds to the ping of the second power transmitter and, during the identification and configuration phase, the mobile phone transmits the received password to the second power transmitter. In an embodiment, the mobile phone transmits the received password during the negotiation phase and the transmitter will send acknowledgement of the password (e.g., that the password is valid or invalid) back to the mobile device. If the password is valid, the power transmitter advances to the power transfer phase 408 and begins charging the mobile device without further user interaction.

Figure 7B:
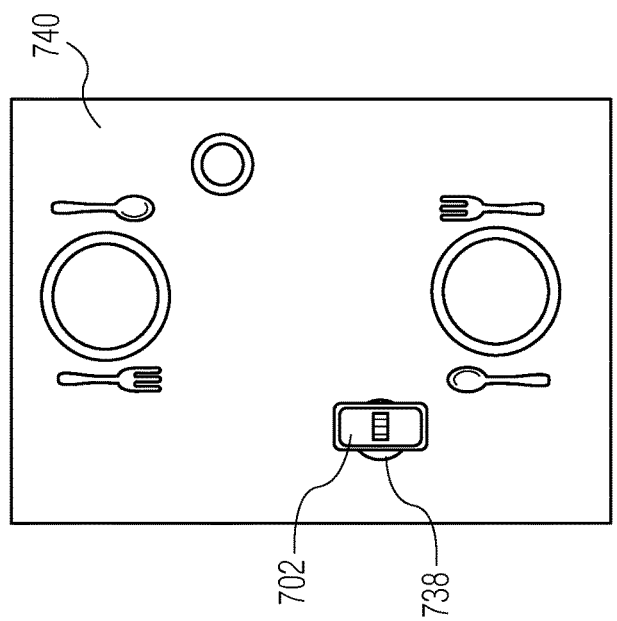
FIG. 7B depicts the mobile device of FIG. 7A on a service pad that includes a second power transmitter at a table, where the mobile device can be charged after exchanging the password for authorizing charging.
Figure 7A:
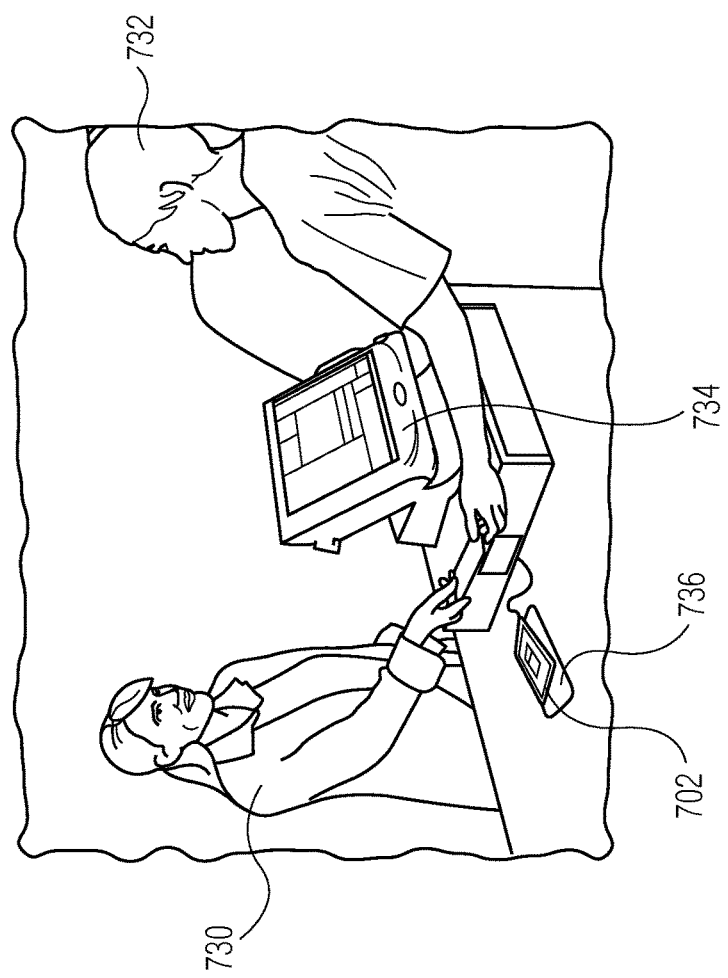
FIG. 7A depicts a customer and a merchant at a point-of-sale system and a mobile device on an initialization pad that includes a power transmitter connected to the point-of-sale system to illustrate the mobile device receiving a password for authorizing charging.

FIG. 7A depicts a customer 730 and a merchant 732 at a point-of-sale system 734 and a mobile device 702 on an initialization pad 736, which includes a power transmitter, coupled to the point-of-sale system to illustrate the mobile device receiving a password to authorize charging. In an embodiment, when the mobile device is placed on the initialization pad, the mobile device can receive a packet from the initialization pad via the IWPT system, with the packet containing a password for authorizing a service such as wireless charging. In an embodiment, the customer or owner of the mobile device can be assessed a fee in order to receive the password from the initialization pad. For example, a customer could purchase a cup of coffee and two hours of wireless charging. When the transaction is completed at the point-of-sale system, the customer can place a mobile device on the initialization pad to allow for communication with the initialization pad via the IWPT system to receive a packet containing the password for authorizing charging.

FIG. 7B depicts the mobile device 702 of FIG. 7A on a service pad 738 that includes a second power transmitter at a table 740, where the mobile device can be charged after providing the previously obtained password to the service pad. In an embodiment, after the customer has finished the transaction at the point-of-sale system, placed the mobile device on the initialization pad, and received the password to authorize charging, then the customer can remove the mobile device from the initialization pad, select a table at which to sit, and place the mobile device on the service pad. When the mobile device is placed on the service pad, the mobile device can transmit the password to the service pad and, if the password is valid, the service pad can begin charging the mobile device using inductive wireless power transfer. In an embodiment, the table can be a bar or any other service location at which the mobile device can be placed and/or charged.

Figure 8:
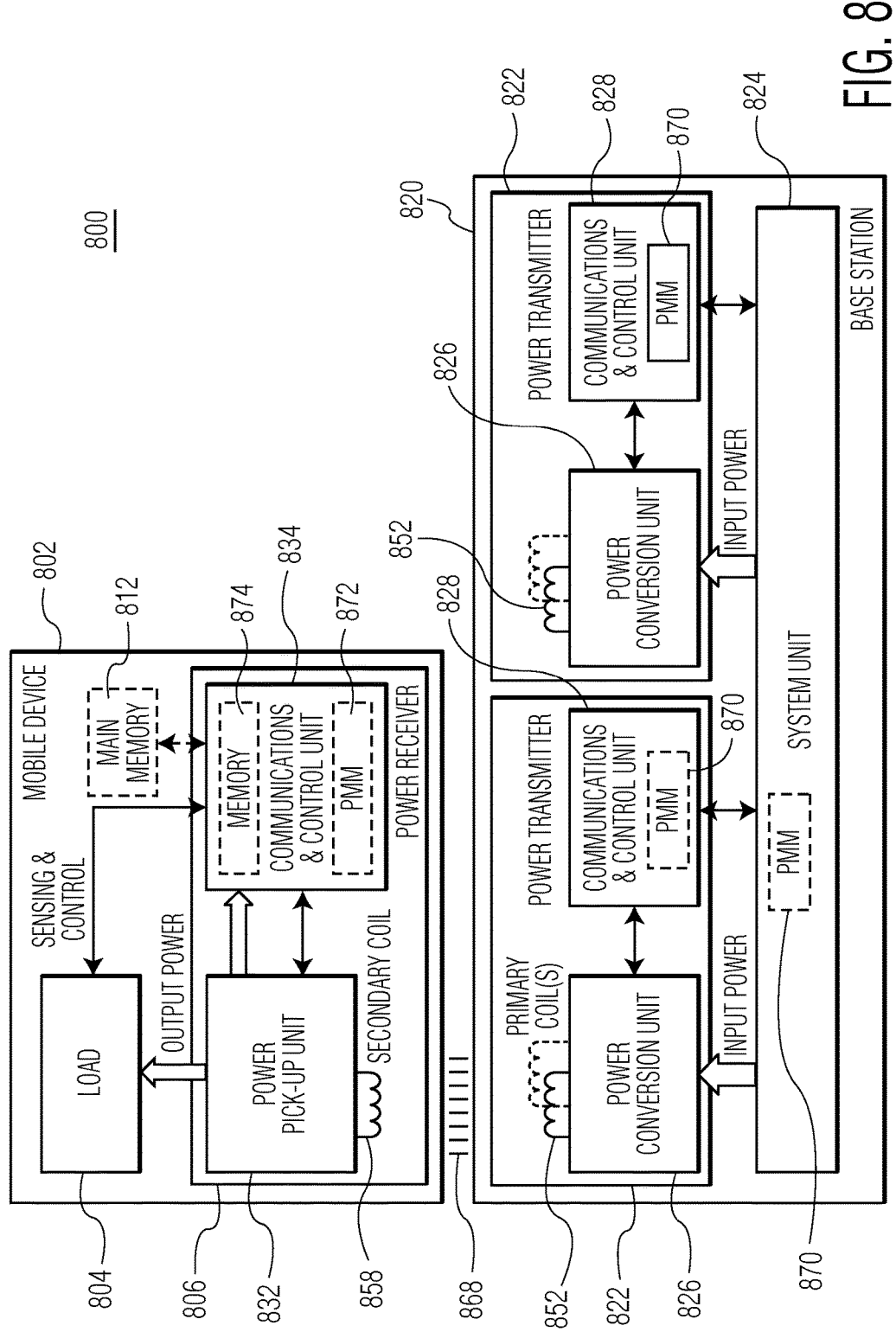
FIG. 8 is a block diagram of an IWPT system that is similar to the IWPT system of FIG. 2, but further includes a password management module (PMM) in the base station, a PMM in the communications and control unit of the power receiver, and memory within the communications and control unit of the power receiver.

A typical IWPT system, as described with reference to FIG. 2, lacks the means to initialize a password exchange or to perform a password exchange to authorize a service as described above. FIG. 8 is a block diagram of an IWPT system 800 that is similar to the IWPT system 200 of FIG. 2, but further includes a password management module (PMM) 870 in the base station (e.g., in the communications and control unit of each power transmitter and/or in the system unit), a password management module 872 in the communications and control unit of the power receiver, and memory 874 within the communications and control unit of the power receiver. In an embodiment, the IWPT system includes a base station 820 and a mobile device 802 in close proximity to the base station. The base station includes two power transmitters 822 coupled to a system unit 824 and the mobile device 802 includes a power receiver 806 and a load 804 (e.g., a rechargeable battery). In an embodiment, the power transmitters of the base station include a power conversion unit 826 and a communications and control unit 828, the communications and control units including the password management modules 870, and the power receiver of the mobile device includes a power pick-up unit 832 and a communications and control unit 834, the communications and control unit including the password management module 872 and memory 874. In an embodiment, the power conversion unit of the power transmitter and the power pick-up unit of the power receiver include coils 852, 858, respectively, which transmit and receive a power signal 868 and the respective communications and control units of the power transmitter and the power receiver are configured to use the power signal to communicate with each other in-band. In an embodiment, the password management module can be located in the system unit.

In an embodiment, the password management modules 870 in the base station (e.g., in each power transmitter or centrally in the system unit) store one or more passwords and match a password received from a mobile device against the one or more passwords to authorize a service. In an embodiment, the one or more passwords stored in the password management modules of the base station can be modified at regular intervals (e.g., hourly, daily, monthly, etc.) such that a mobile device must receive a new password once per interval in order to match and authorize the service. For example, a mobile device must receive a new password each morning in order to authorize charging for that day. In an embodiment, the memory of the mobile device is non-volatile memory local to the power receiver of the mobile device. In an embodiment, memory is local to the power receiver when it is physically within the power receiver, accessed exclusively by the power receiver, and powered by the power pick-up unit of the power receiver. Because the memory is local and non-volatile, the initialization pad (e.g., a base station with a power transmitter) can provide a small amount of power such that the power receiver powers-on and a password can be stored in the local memory without providing additional power to power-on other components of the mobile device (e.g., the main processor unit, the main memory, the transceiver, or the user-interface). That is, the mobile device can store the password in memory within the power receiver so that the memory is accessible by powering on just the power receiver (e.g., with power received from the power transmitter via a power signal during the ping phase) even when the rest of the mobile device cannot power on and/or the battery is fully discharged. Alternatively, the mobile device can store the password in the main memory 812, which requires enough power from the battery to power-on. In an embodiment, the main memory is accessible without fully powering-on the mobile device (e.g., without powering-on the main processor unit, the main memory, the transceiver, or the user-interface), but is not accessible when the battery is fully discharged.

As described above, an IWPT system can communicate in-band. That is, a power transmitter and/or system unit can communicate with a mobile device using Qi without using other out-of-band communication channels such as a user interface, NFC, or Wi-Fi. Thus, a password exchange can be facilitated solely by the IWPT system by modulating the amount of power flowing between the power transmitter and the power receiver. For example, the power receiver can modulate the load pulled from the power transmitter to generate a signal using ASK. The signal generated with ASK or FSK can carry an ASK or FSK packet having the structure defined in the Qi specification. Accordingly, the password exchange can be facilitated without powering-on other components of the mobile device and can be performed without further user interaction after the mobile device has been placed within range of a power signal. Additionally, the communications between the power transmitter and the power receiver cannot be accessed by a user on the power receiver. That is, a user cannot see what password is stored or being sent to the power transmitter. Accordingly, a user cannot share the password with another user or manually modify the password stored in the power receiver because the user cannot access the password and, thus, the security of the password exchange is more difficult to compromise. Thus, in an embodiment, by using a single band of communication (e.g., just Qi), a password exchange can be securely facilitated entirely in-band without powering-on other components of the mobile device.

Figure 9:
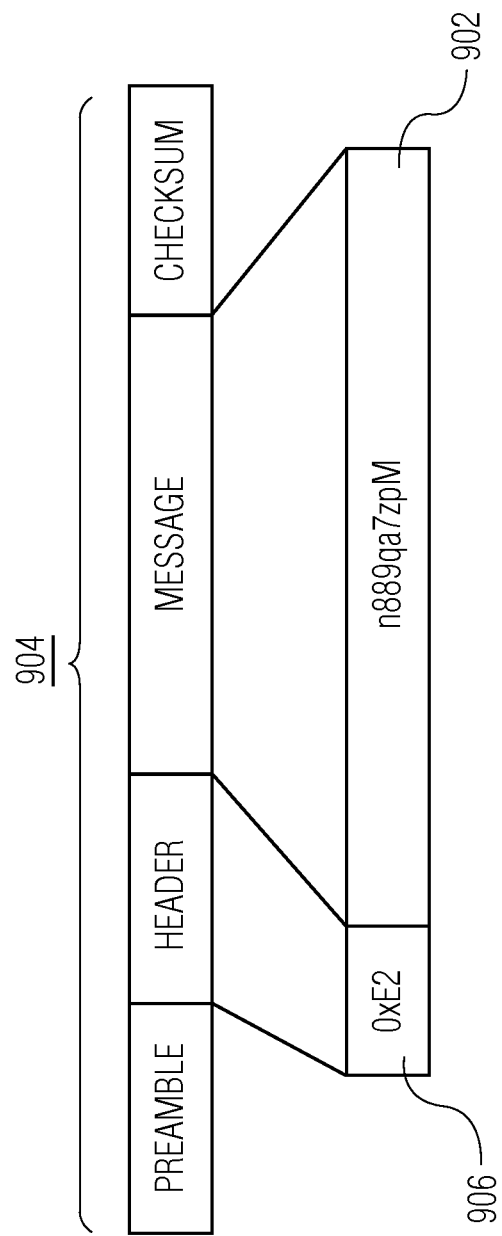
FIG. 9 depicts a password carried in a packet that has the structure of a packet according to the Qi wireless charging protocol.

FIG. 9 depicts a password 902 carried in a packet 904 that has the structure of a packet according to the Qi wireless charging protocol. As described above with reference to FIG. 5, the header field 906 is set to "0xE2" to indicate that a proprietary message is being sent. In an embodiment, the value in the header field indicates that the message carries a password. In an embodiment, if the password matches a password stored in a power transmitter, then a service is authorized. In an embodiment, a single password can be stored in the power transmitter (single password configuration) and a match authorizes the service. In another embodiment, multiple passwords can be stored in the power transmitter (multi-password configuration) and a match with one of the passwords authorizes the service associated with the matching password.

FIG. 10 depicts a table 1002 of charging profiles and corresponding passwords. As described above with reference to FIG. 9, a packet can carry a password to be matched against a table of passwords that correspond to profiles. For example, if a packet carrying password "n889qa7zpM" is received and matched against the table of charging profiles in FIG. 10, then the password will match the bronze profile. A user can configure the table to include one or more profiles and can associate a different service with each profile. For example, the bronze profile can be associated with a five hour charging service, while a gold profile can be associated with a one month, unlimited charging service. In an embodiment, services can vary in time (e.g., one hour or one month), quality (e.g., high power fast charging or low power slow charging), and type (e.g., charging or paid parking). In an embodiment, the passwords correspond to charging profiles and the same password can be transmitted to multiple mobile devices in order to enable the multiple mobile devices to receive the same service (e.g., 2 hours of power). Additionally, a single password can be assigned to multiple mobile devices and corresponds to a charging profile rather than to the identity of a particular mobile device. In an embodiment, a password is distinct from a service ID (e.g., an international mobile subscriber identity (IMSI) or a mobile identification number (MIN)) or other device ID (e.g., a media access control (MAC) address or a serial number).

In an embodiment, the mobile device can be an electric vehicle or a larger electric device, such as a household appliance, powered by a battery. In an embodiment, when the mobile device is placed on a service pad and a password is transmitted to the service pad, other services besides charging, such as parking or confirming attendance at an event, can be performed as well. In other embodiments, the mobile device may be a battery-powered device other than a mobile phone or electric vehicle configured to utilize the above-described in-band password management technique. Additionally, the above-described in-band password management technique can be applied to other IWPT protocols besides Qi or PMA.

Figure 11:
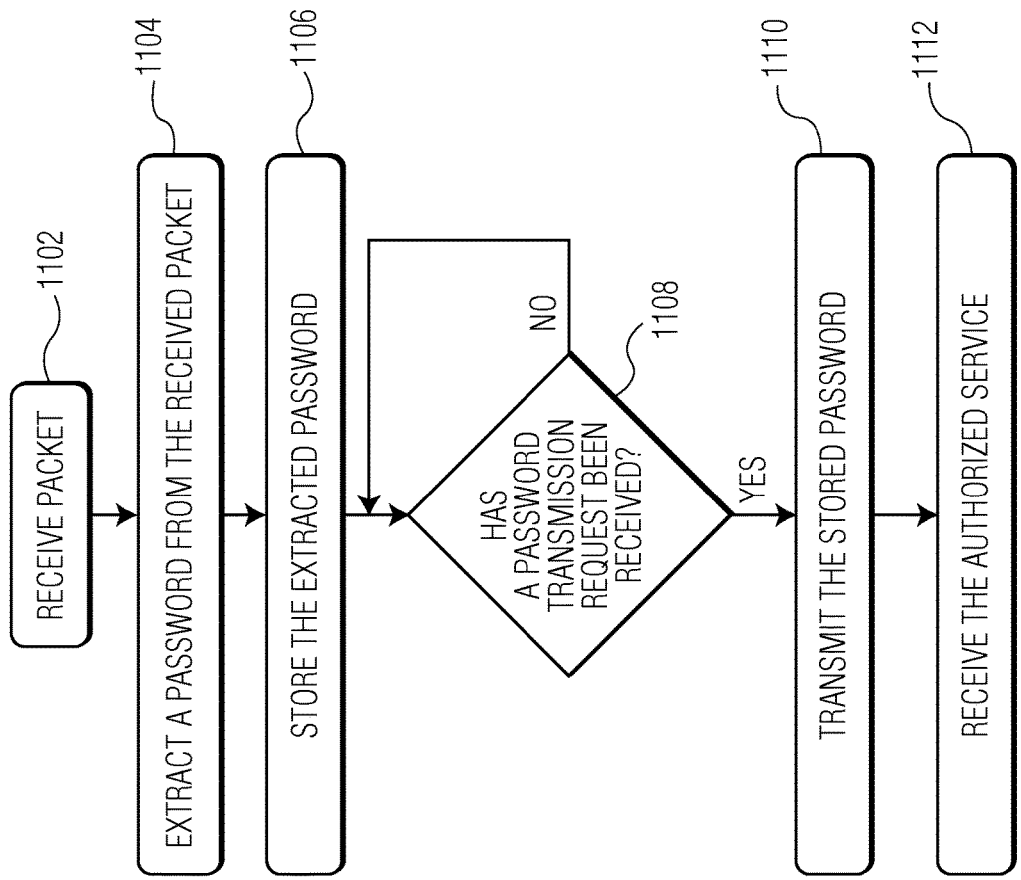
FIG. 11 is a block diagram of a method for authorizing a service in accordance with an embodiment of the invention.

FIG. 11 is a block diagram of a method for authorizing a service in accordance with an embodiment of the invention. At block 1102, a mobile device receives a packet. In an embodiment, the packet is carried by a first power signal over an IWPT system using an inductive wireless power transfer communication protocol, such as Qi or PMA, and received by a power receiver in a mobile device. At block 1104, a password is extracted from the packet. In an embodiment, a password management module in the power receiver is configured to determine if the packet carries a password based on the header of the packet and, if the header indicates the presence of a password in the packet, extracts the password without powering on additional components of the mobile device (e.g., without powering-on the main processor unit, the main memory, the transceiver, or the user-interface). At block 1106, the extracted password is stored. In an embodiment, the extracted password is stored in memory local to the power receiver (e.g., memory that is physically part of the power receiver and is powered with power received exclusively from the power receiver). Thus, the memory can be accessed and the password stored without powering-on additional components of the mobile device. At decision point 1108, the power receiver waits until a password transmission request has been received. In an embodiment, a password transmission request is received via a proprietary packet during the identification and configuration phase, but could be received via other mechanisms. At block 1110, the stored password is transmitted. In an embodiment, the password management module of the power receiver is configured to transmit the stored password using a second power signal over the IWPT system using an inductive wireless power transfer communication protocol. In an embodiment, the password is transmitted to a base station and a password management module of the base station (e.g., a password management module in a power transmitter or in a system unit) is configured to match the transmitted password against a table of passwords (e.g., the table of passwords shown in FIG. 10) and, if a match occurs, it is determined that the password authorizes a service. In an embodiment, a table is used to determine if the password authorizes a service as described with reference to FIG. 10. At block 1112, the authorized service is received. In an embodiment, if the password does not authorize a service, then a guest service is received. In an embodiment, a guest service is a shortened version of an authorized service. For example, if an authorized service is two hours of charging, then a guest service may be five minutes of charging. In another embodiment, guest services may be unavailable and no service is received. In an embodiment, a password can be transmitted to a customer without payment as part of a rewards program or for tracking customer behavior.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods may be implemented using software instructions stored on a computer useable storage medium for execution by a computer. As an example, an embodiment of a computer program product includes a computer useable storage medium to store a computer readable program that, when executed on a computer, causes the computer to perform operations, as described herein.

Furthermore, embodiments of at least portions of the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The computer-useable or computer-readable medium can be an electronic, magnetic, optical, electromagnetic, infrared, or semiconductor system (or apparatus or device), or a propagation medium. Examples of a computer-readable medium include a semiconductor or solid state memory, magnetic tape, a removable computer diskette, a random access memory (RAM), a read-only memory (ROM), a rigid magnetic disc, and an optical disc. Current examples of optical discs include a compact disc with read only memory (CD-ROM), a compact disc with read/write (CD-R/W), a digital video disc (DVD), and a Blu-ray disc.

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A method for authorizing a service, the method comprising:
   transmitting a packet having a negotiation bit to a power transmitter, wherein the negotiation bit is set to indicate that negotiation is possible;
   receiving, at a power receiver within a mobile device, a packet carried via a first power signal according to an inductive wireless power transfer communications protocol; and
   responsive to determining that the negotiation bit is set:
   extracting a password from the received packet;
   storing the extracted password in memory within the power receiver; and
   transmitting the stored password in a packet via a second power signal according to the inductive wireless power transfer communications protocol to authorize the service; and
   responsive to determining that the negotiation bit is not set, then the service is authorized at a reduced level;
   wherein the power receiver is configured without a pathway by which a user of the mobile device can see the password stored in the memory or see the received packet.

2. The method of claim 1, wherein the extracting is performed in response to:
   receiving the packet carried via the first power signal; and
   recognizing that a packet header of the received packet indicates a presence of the password in the received packet.

3. The method of claim 1, wherein the service is a transmission of power for charging the mobile device.

4. The method of claim 1, wherein the packet having the negotiation bit, the received packet, and the packet transmitted via the second power signal use Qi protocol packet structure.

5. The method of claim 1, wherein the password from the received packet corresponds to a service in a plurality of services.

6. The method of claim 1, wherein the method further comprises:
   powering on the power receiver with power received from at least one of the first power signal and a third power signal; and
   performing the extracting, the storing, and the transmitting the stored password using the power received from the at least one of the first power signal and the third power signal;
   wherein the third power signal is used to affect a power transfer.

7. The method of claim 6, wherein additional components within the mobile device are not powered on to perform the extracting, the storing, and the transmitting the stored password.

8. The method of claim 1, wherein the password from the received packet is transmitted in response to a negotiation request from the power receiver.

9. A method for inductive wireless charging of a mobile device, the method comprising:
   transmitting a packet having a negotiation bit to a power transmitter, wherein the negotiation bit is set to indicate that negotiation is possible;
   receiving, at a power receiver within the mobile device, a packet carried via a first power signal according to an inductive wireless power transfer communications protocol; and
   responsive to determining that the negotiation bit is set:
   extracting a password from the received packet;
   storing the extracted password in memory within the power receiver;
   transmitting the stored password in a packet via a second power signal according to the inductive wireless power transfer communications protocol; and
   receiving a power transfer at the power receiver of the mobile device in response to the transmitting the stored password; and
   responsive to determining that the negotiation bit is not set, then a reduced power transfer is received;
   wherein the power receiver is configured without a pathway by which a user of the mobile device can see the password stored in the memory or see the received packet.

10. The method of claim 9, wherein the extracting is performed in response to:
    receiving the packet carried via the first power signal; and
    recognizing that a packet header of the received packet indicates a presence of the password in the received packet.

11. The method of claim 9, wherein the packet having the negotiation bit, the received packet, and the packet transmitted via the second power signal use Qi protocol packet structure.

12. The method of claim 9, wherein the password from the received packet corresponds to a charging profile in a plurality of charging profiles.

13. The method of claim 9, wherein the method further comprises:
   powering on the power receiver with power received from at least one of the first power signal and a third power signal; and
   performing the extracting, the storing, and the transmitting the stored password using the power received from the at least one of the first power signal and the third power signal;
   wherein the third power signal is used to affect a power transfer.

14. The method of claim 13, wherein additional components within the mobile device are not powered on to perform the extracting, the storing, and the transmitting the stored password.

15. The method of claim 9, wherein the password from the received packet is transmitted in response to a negotiation request from the power receiver.

16. A mobile device, the mobile device comprising:
   a power receiver configured to:
      transmit a packet having a negotiation bit to a power transmitter, wherein the negotiation bit is set to indicate that negotiation is possible;
      receive a packet carried via a first power signal according to an inductive wireless power transfer communications protocol; and
      responsive to determining that the negotiation bit is set:
         extract a password from the received packet;
         store the extracted password in memory within the power receiver of the mobile device; and
         transmit the stored password in a packet via a second power signal according to the inductive wireless power transfer communications protocol to authorize a service; and
      responsive to determining that the negotiation bit is not set, then a reduced level of the service is authorized;
      wherein the power receiver is configured without a pathway by which a user of the mobile device can see the password stored in the memory or see the received packet.

17. The mobile device of claim 16, wherein the mobile device is further configured to:
   power on the power receiver with power received from at least one of the first power signal and a third power signal; and
   perform the extracting, the storing, and the transmitting the stored password using the power received from the at least one of the first power signal and the third power signal;
   wherein the third power signal is used to affect a power transfer.

18. The mobile device of claim 17, wherein the mobile device further comprises a main processing unit, a main memory, and a user interface and wherein the mobile device is configured such that the main processing unit, the main memory, and the user interface are not powered on to perform the extracting, the storing, and the transmitting the stored password.

* * * * *